United States Patent
Ziemer et al.

(10) Patent No.: US 10,125,867 B2
(45) Date of Patent: Nov. 13, 2018

(54) DEVICE TO ACTUATE SHIFTING ELEMENTS OF A TRANSMISSION

(71) Applicant: ZF Friedrichshafen AG, Friedrichshafen (DE)

(72) Inventors: Peter Ziemer, Tettnang (DE); Thilo Schmidt, Meckenbeuren (DE); Martin Brehmer, Tettnang (DE); Andreas Beisswenger, Aulendorf (DE); Ingo Tetzlaff, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 166 days.

(21) Appl. No.: 15/141,857

(22) Filed: Apr. 29, 2016

(65) Prior Publication Data
US 2016/0319932 A1 Nov. 3, 2016

(30) Foreign Application Priority Data
Apr. 29, 2015 (DE) ........................ 10 2015 207 930

(51) Int. Cl.
| | | |
|---|---|---|
| F16D 25/10 | (2006.01) | |
| F16H 63/30 | (2006.01) | |
| F16H 3/66 | (2006.01) | |

(52) U.S. Cl.
CPC ......... F16H 63/3026 (2013.01); F16D 25/10 (2013.01); F16H 3/663 (2013.01);
(Continued)

(58) Field of Classification Search
CPC ........... F16H 63/3026; F16H 2063/303; F16H 2200/2023; F16H 2200/201; F16H 3/663;
(Continued)

(56) References Cited

U.S. PATENT DOCUMENTS

| | | | | |
|---|---|---|---|---|
| 3,747,727 A | * | 7/1973 | Dach | ................... F16D 25/0638 138/115 |
| 7,026,770 B2 | | 4/2006 | Hemphill et al. | |

(Continued)

FOREIGN PATENT DOCUMENTS

| | | |
|---|---|---|
| DE | 3446460 A1 | 7/1986 |
| DE | 102004038955 A1 | 3/2005 |

(Continued)

OTHER PUBLICATIONS

German Search Report DE102015207930.9, dated Feb. 17, 2016. (8 pages).

*Primary Examiner* — Ramya P Burgess
*Assistant Examiner* — Lillian T Nguyen
(74) *Attorney, Agent, or Firm* — Dority & Manning, P.A.

(57) ABSTRACT

A device for actuating multiple shift elements of a transmission device is described. Each of the pistons for a change in operating state of the shift elements in the area of active surfaces can be subjected to a fluid pressure acting in a first or second actuating direction. The fluid pressure actively applied in the first actuating direction can be separately adjusted for each of the shift elements, while the fluid pressure actively applied in the second actuating direction is essentially the same for all shift elements. The pistons are arranged coaxially to each other, radially into each other, and in a manner axially displaceable in sections in one intermediate plate. The intermediate plate features areas for applying the fluid pressures acting in the first actuating direction. The area through which the fluid pressure acting in the second actuating direction can be guided to the pistons is limited.

14 Claims, 10 Drawing Sheets

(52) U.S. Cl.
CPC .. *F16H 2063/303* (2013.01); *F16H 2200/006* (2013.01); *F16H 2200/201* (2013.01); *F16H 2200/2012* (2013.01); *F16H 2200/2023* (2013.01); *F16H 2200/2046* (2013.01); *F16H 2200/2064* (2013.01); *F16H 2200/2094* (2013.01)

(58) Field of Classification Search
CPC ..... F16H 2200/2064; F16H 2200/2046; F16H 2200/2012; F16H 2200/006; F16H 2200/2094; F16D 25/10; F16D 25/12; F16D 25/082; F16D 25/083; F16D 2300/18
See application file for complete search history.

(56) References Cited

U.S. PATENT DOCUMENTS

| | | | |
|---|---|---|---|
| 7,303,043 B2 | 12/2007 | Hemphill et al. | |
| 7,971,500 B2 * | 7/2011 | Diosi | F16D 13/683 |
| | | | 192/70.2 |
| 8,127,911 B2 | 3/2012 | Honselmann et al. | |
| 8,137,237 B2 | 3/2012 | Staudinger et al. | |
| 9,719,562 B2 * | 8/2017 | Azumai | F16D 21/06 |
| 2008/0202884 A1 * | 8/2008 | Nishida | F16D 25/0638 |
| | | | 192/106 F |
| 2016/0108972 A1 * | 4/2016 | Downs | F16D 29/005 |
| | | | 192/48.618 |

FOREIGN PATENT DOCUMENTS

| | | |
|---|---|---|
| DE | 102008005144 A1 | 8/2008 |
| DE | 102008047170 A1 | 4/2009 |

* cited by examiner

Fig. 1

| GEAR | C | B | D | E | A | F | TRANSMISSION RATIO | GEAR JUMP |
|---|---|---|---|---|---|---|---|---|
| 1VM |   | O |   |   |   | O | 6.51 | 1.64 |
| 2VM |   |   | O |   |   | O | 3.97 | 1.56 |
| 3VM | O | O | O |   |   |   | 2.55 | 1.55 |
| 4VM | O |   | O |   | O |   | 1.64 | 1.55 |
| 5VM |   | O |   | O | O |   | 1.31 | 1.25 |
| 6VM |   |   |   | O | O |   | 1.00 | 1.31 |
| 7VM |   | O |   | O |   |   | 0.75 | 1.34 |
| 8VM | O |   |   |   |   |   | 0.64 | 1.16 |
| EDA-Start-Up |   |   | O |   |   |   |   |   |
| EDA-Start-Up |   | O |   |   |   |   |   |   |
| V/R Start-Up |   |   |   |   |   | O | 6.51 | SPREAD: 10.1 |

DEVICE TO ACTUATE SHIFTING ELEMENTS OF A TRANSMISSION

FIELD OF THE INVENTION

The present invention relates generally to a space-saving device for actuating multiple shift elements of a transmission device.

BACKGROUND

A device for controlling multiple hydraulic shift cylinders is known from DE 10 2008 005 144 A1. The device comprises a pressure control valve with a first and with a second pressure control output. A first switching valve is downstream to the pressure control outputs; this is provided upstream of a second switching valve designed with multiple individual pressure outputs. Through the first and the second switching valves, the second pressure-regulating output can be connected selectively to one of the individual pressure outputs, while each of the individual pressure outputs not allocated to the second pressure-regulating output can be allocated to the first pressure-regulating output.

SUMMARY OF THE INVENTION

In exemplary aspects, the present invention is subject to the task of providing a device that saves installation space for actuating multiple shift elements of a transmission device. Additional objects and advantages of the invention will be set forth in part in the following description, or may be obvious from the description, or may be learned through practice of the invention.

With the device in accordance with exemplary aspects of the invention for actuating multiple shift elements of a transmission device, each of the pistons capable of changing the operating state of the shift elements in the area of active surfaces can be subjected to a fluid pressure acting in a first actuating direction or a fluid pressure acting in a second actuating direction. The fluid pressure that can be actively applied in the first actuating direction can be separately adjusted for each of the shift elements, while the fluid pressure that can be actively applied in the second actuating direction is essentially the same for all shift elements.

In addition, with the device in accordance with exemplary aspects of the invention, the pistons are arranged, in a manner that saves installation space, coaxially to each other and radially into each other and in a manner axially displaceable in sections in one intermediate plate, whereas the intermediate plate features areas for applying the fluid pressures acting in the first actuating direction of the pistons to the active surfaces of the pistons. Moreover, the area through which the fluid pressure that can be applied to the active surfaces of the pistons and acting in the second actuating direction can be guided to the pistons is, in a structurally simple manner, limited by the intermediate plate and the pistons.

With an embodiment of the device in accordance with exemplary aspects of the invention that is easy to manufacture and can be mounted with little effort, the intermediate plate comprises multiple annular flanges that are spaced from each other concentrically and in a radial direction, which extend from a bottom plate area in the direction of a free end area turned away from the bottom plate area and between which ring-shaped piston chambers are formed, in which each of the pistons is arranged in a manner displaceable in sections.

If the areas provided for applying the fluid pressures acting in the first actuating direction of the pistons are provided in a running manner at the active surfaces of the pistons in the bottom plate area, the pistons in turn can be actuated in a manner that saves installation space.

With an additional form of the device in accordance with exemplary aspects of the invention designated by a structurally simple design, both the annular flanges of the intermediate plate and the pistons are designed with bore holes in the area in connection with each other, through which the fluid pressure that can be applied to the active surfaces of the pistons and acting in the second actuating direction can be guided to the pistons.

If a sensor device is provided for detecting the current axial position of the pistons, an actuation to the desired extent of shift elements designed as positive-locking shift elements, such as claw shift elements or the like, is particularly feasible.

If both the pistons and at least one annular flange of the intermediate plate are designed with recesses, through which sensor carriers or sensor holders (which are preferably pin-shaped) of the sensor device can be guided to the pistons, whereas each of the sensor device ends turned towards the pistons is formed with hollow elements, which work with sensor areas of the pistons, the current axial position of the pistons can be detected in a manner that is structurally simple and saves installation space.

With one embodiment of the device in accordance with exemplary aspects of the invention that is structurally simple and can also be manufactured cost effectively, at least one sensor area of a piston is designed in a cone shape and is preferably manufactured from ferromagnetic material.

If at least one sensor area of a piston comprises a conical annular surface, which preferably consists of ferromagnetic material, the sensor device can also be used for detecting the axial position of a rotating piston.

With an embodiment of the device in accordance with exemplary aspects of the invention that can easily be manufactured and saves installation space, the sensor carrier of the sensor device is formed in a pin shape and, through slot-like recesses, extends from the pistons to the sensor area of the piston working with it, the axial position of which must be detected in each case.

In accordance with an additional exemplary form of the device, in order to actuate shift elements designed as clutches to a desired extent, the pistons reached by the sensor device in a radial direction are formed in a torque-proof manner, for example, by synchronization toothings, and through a rotational decoupling are each operatively connected to the shift element halves of the shift elements to be actuated, whereas the rotational decoupling may include slide bearings and/or roller bearings depending on the load.

With an embodiment of the device in accordance with exemplary aspects of the invention that saves installation space and is structurally simple, the sensor device is arranged between the rotational decouplings and the shift elements, or between the rotational decouplings and the active surfaces of the pistons that can be subjected to fluid pressures.

With an embodiment of the device in accordance with exemplary aspects of the invention that is structurally simple and can be operated with little effort, the pistons of the shift elements formed as clutches, along with the corresponding areas on the annular flanges, are designed for anti-rotation protection with synchronization toothings.

With a further advantageous embodiment of the device in accordance with exemplary aspects of the invention, in the area of the rotational decouplings, synchronization toothings are provided for anti-rotation protection for guard plates, through which the relative motion between the co-rotating pistons and the shift elements coupled through rotating sleeves are, in each case, led in a targeted manner to the areas between the guard plates and the bands of the sleeves.

With an additional form of the device in accordance with exemplary aspects of the invention that is likewise structurally simple, the sleeves and the guard plates are arranged and axially fixed in an axial direction between the stop areas of the pistons and the snap rings inserted into the pistons.

Both the characteristics specified in the claims and the characteristics specified in the subsequent embodiments of the device in accordance with exemplary aspects of the invention are, by themselves alone or in any combination with one another, suitable for providing additional forms for the object in accordance with the invention.

Additional advantages and advantageous embodiments of the device in accordance with the invention arise from the claims and the embodiments described below, with reference to the drawing in terms of principle, whereas, in the description of the various embodiments, for the benefit of clarity, the same reference signs are used for structurally and functionally identical components.

BRIEF DESCRIPTION OF THE DRAWINGS

In the following, the invention is more specifically illustrated as an example on the basis of the attached figures. The following are represented in these.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
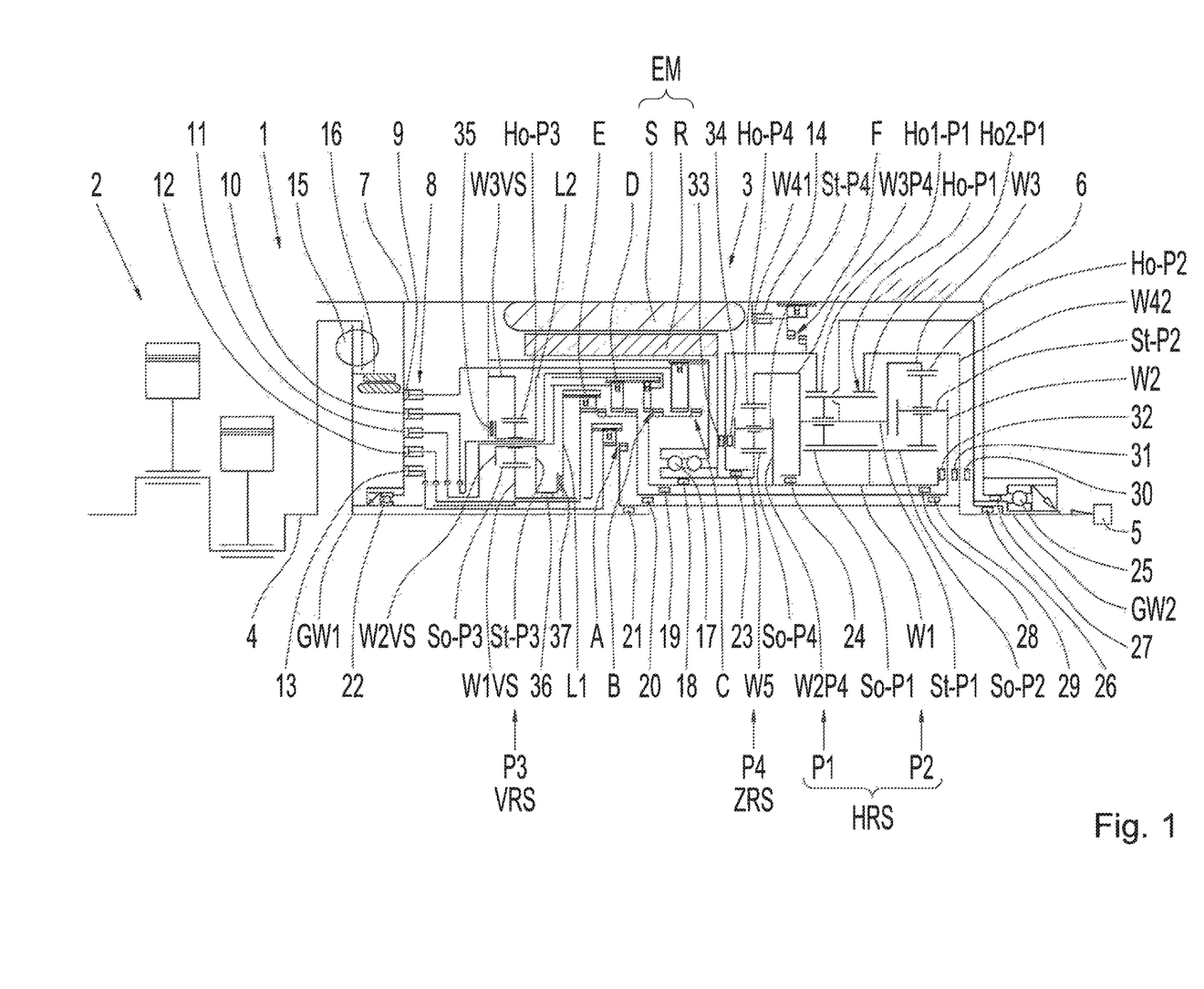
FIG. 1 is a highly schematic partial representation of a vehicle drive train with an exemplary transmission device.

FIG. 1 shows a part of a vehicle drive train 1 with a drive motor 2, which in this case is configured as an internal combustion engine, and a transmission device 3, which in this case is arranged in the power flow between an output shaft 4 of the drive motor 2 and an output 5 of the vehicle drive train 1.

The transmission device 3 features a transmission input shaft GW1, a transmission output shaft GW2, an upstream gear set VRS, an auxiliary gear set ZRS and a main gear set HRS. The upstream gear set VRS includes a three-shaft planetary gear set P3. The auxiliary gear set ZRS is likewise a three-shaft planetary gear set P4, while the main gear set HRS features a first planetary gear set P1 and a second planetary gear set P2. All planetary gear sets P1 to P4 are formed as negative gear sets.

The representation of the transmission device 3 essentially shows the connectable and connected elements of the transmission device 3. Conclusions regarding the transmission ratio relationships cannot be drawn by the distances selected in the representation of the transmission device 3.

The transmission input shaft GW1 is connected to a sun gear So-P3 of the planetary gear set P3 of the upstream gear set VRS, while a ring gear Ho-P3 of the planetary gear set P3 of the upstream gear set VRS is connected in a torque-proof manner to a transmission housing 6 of the transmission device 3, or to a structural element of the transmission device 3 fixed in a torque-proof manner. From the transmission input shaft GW1, power can be transferred in the direction of the main gear set HRS through both a first power path L1 and a second power path L2. Through the second power path L2, a rotational speed modified in comparison to the rotational speed of the transmission input shaft GW1 can be forwarded in the direction of the main gear set HRS.

This results from the fact that the rotational speed of the transmission input shaft GW1 is translated by the transmission ratio between the sun gear So-P3 and a carrier St-P3 of the planetary gear set P3 of the upstream gear set VRS. In the area of the first power path L1, the rotational speed of the transmission input shaft GW1 is forwarded, without a further transmission ratio, in the direction of the main gear set HRS. Thereby, the sun gear So-P3 of the planetary gear set P3 of the upstream gear set VRS is a component of a first shaft W1VS of the upstream gear set VRS, which is connected to the transmission input shaft GW1. The carrier St-P3 of the first planetary gear set P3 of the upstream gear set VRS is a component of a second shaft W2VS of the upstream gear set VRS. The structural element on which the ring gear Ho-P3 of the planetary gear set P3 of the upstream gear set VRS is supported is designated below as the third shaft W3VS of the upstream gear set VRS.

The sun gears So-P1, So-P2 of the first and second planetary gear sets P1, P2 of the main gear set HRS are connected to each other and constitute components of a first shaft W1 of the main gear set HRS. A carrier St-P1 of the first planetary gear set P1 of the main gear set HRS is connected to a ring gear Ho-P2 of the second planetary gear set P2 of the main gear set HRS, and at the same time is a component of a third shaft W3 of the main gear set HRS. A ring gear Ho-P1 of the first planetary gear set P1 of the main gear set HRS is designed in two parts, whereas each of the two parts Ho1-P1 and Ho2-P1 is a component of a shaft W41 and an additional shaft W42 of the main gear set HRS. Between the two parts Ho1-P1 and Ho2-P2 of the ring gear of the first planetary gear set P1, the third shaft W3 of the main gear set HRS runs in a radial direction; this leads to the transmission output shaft GW2. A carrier St-P2 of the second planetary gear set P2 of the main gear set HRS is a component of a second shaft W2 of the main gear set HRS.

A sun gear So-P4 of the planetary gear set P4 of the auxiliary gear set ZRS is a component of the first shaft W5 of the auxiliary gear set ZRS, and is connected to a rotatably mounted rotor R of an electric motor EM of the transmission device 3. A carrier St-P4 of the planetary gear set P4 of the auxiliary gear set ZRS is a component of a second shaft W2P4 of the auxiliary gear set ZRS, and is operatively connected to the first shaft W1 of the main gear set HRS. A ring gear Ho-P4 of the planetary gear set P4 of the auxiliary gear set ZRS is a component of a third shaft W3P4 of the auxiliary gear set ZRS, and is connected to the third shaft W3 of the main gear set HRS. In addition to the rotor R, the electric motor EM of the transmission device 3 includes a stator S, which is connected in a torque-proof manner to the transmission housing 6 of the transmission device 3 or a component 7 fixed to the housing, which is hereinafter also referred to as a "bearing shield." Thus, the stator S is designed to be torque-proof and cannot accept a rotational speed.

The third shaft W3 of the main gear set HRS, which in the present case is connected directly to the transmission output shaft GW2, may, for this purpose, alternatively be coupled through an additional transmission gearing with the transmission output shaft GW2.

The first power path L1 is connectable through a first shift element A to the shaft W42 of the main gear set HRS, and through a second shift element E to the second shaft W2 of the main gear set HRS. The second power path L2 can be coupled through a third shift element B with the first shaft W1 of the main gear set HRS, and through a fourth shift element D with the second shaft W2 of the main gear set HRS. The first shaft W1 of the main gear set HRS is connectable through a fifth shift element C to the transmission housing 6 of the transmission device 3 and the component 7 fixed to the housing of the transmission device 3. Thus, with a closed fifth shift element C, the first shaft W1 of the main gear set HRS designed to be torque-proof. In the same manner, the shaft W41 of the main gear set HRS can be presented in a torque-proof manner by a sixth shift element F, by the shaft W41 being brought into operative connection through the sixth shift element F to the transmission housing 6.

Figure 3:
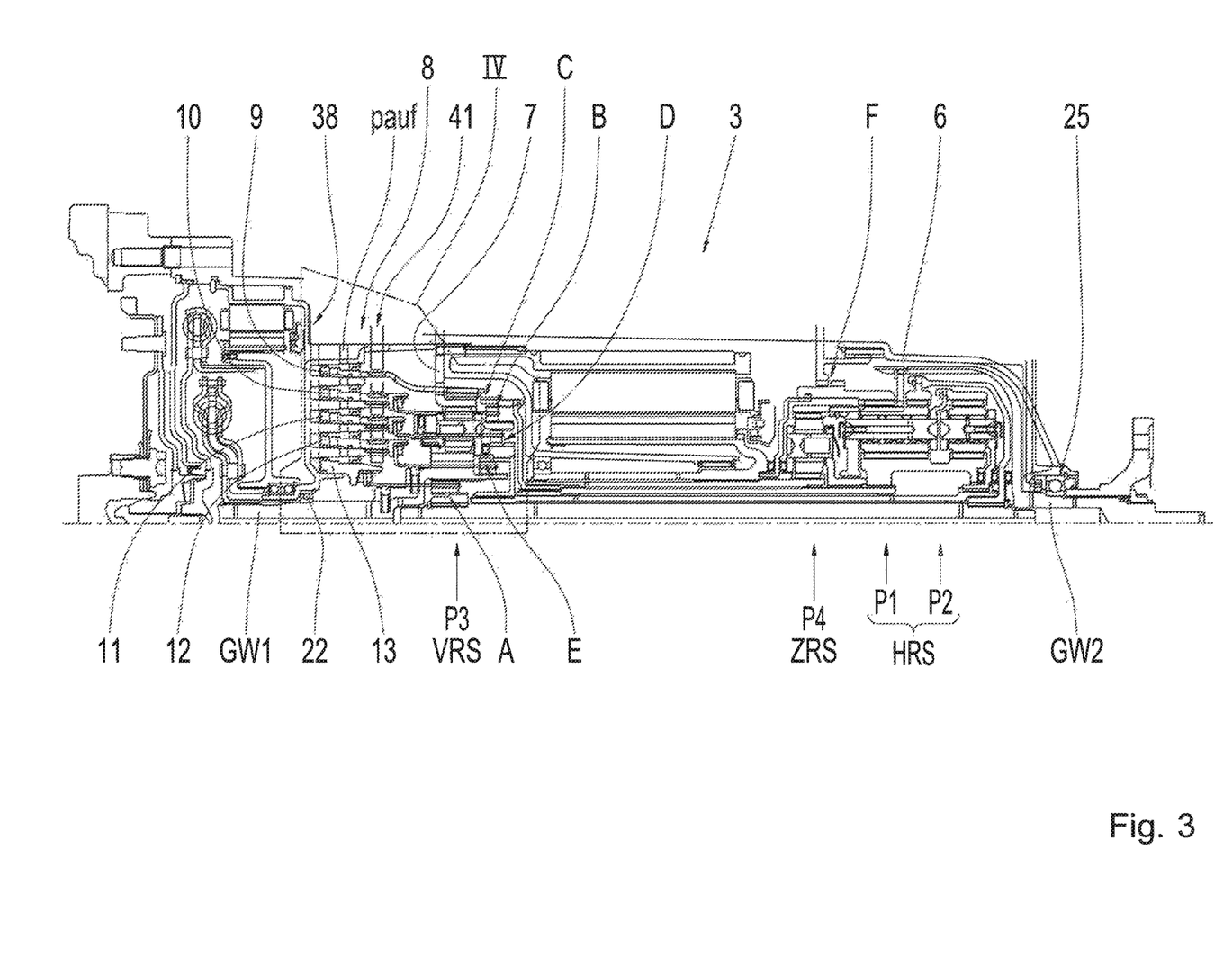
FIG. 3 is a detailed representation of the exemplary transmission device in accordance with FIG. 1 with a first exemplary embodiment of the device in accordance with the invention.

The shift elements A to F of the transmission device 3 in accordance with FIG. 3 are all designed as positive-locking shift elements, whereas the shift elements C and F are formed as brakes, while each of the shift elements A, B, D, and E is a clutch. Depending on the particular application, there is also the option that one or more of the shift elements A to F are formed as frictional-locking shift elements.

With the exemplary embodiment of the transmission device 3 shown in FIG. 1 and FIG. 3, the positive-locking shift elements A to E are actuated by means of a device 8. In this case, the device 8 comprises multiple pistons 9 through 13 capable of changing the operating states of the shift elements A to F in the area of active surfaces, each piston can be subjected with a fluid pressure acting in a first actuating direction or with a fluid pressure acting in a second actuating direction, in a manner described in more detail below. The respective fluid pressure pAzu through pEzu actively applied in the first actuating direction, which subjects the pistons 9 through 13 of the device 8 to an actuating force acting in a closing direction of the shift elements A to F, can be separately adjusted for each of the shift elements A through F. The fluid pressure or hydraulic pressure pauf that can be applied in the second actuating direction, which subjects the pistons 9 through 13 of the device 8 to an actuating force acting in an opening direction of the shift elements A through E, is essentially the same for each of the shift elements A to E. Furthermore, an additional piston 14 is provided, which is allocated to the shift element F and is likewise actuated by means of fluid, in order to open or close the shift element F.

Thereby, all of the pistons 9 through 14 are adjustable between a first end position and a second end position by applying the fluid pressures pAzu through pEzu or pauf, as the case may be. In the first end position of the pistons 9 to 14, the shift elements A through F are completely opened, while the shift elements A through F are completely closed in the second end position of the pistons 9 through 13.

Figure 2:
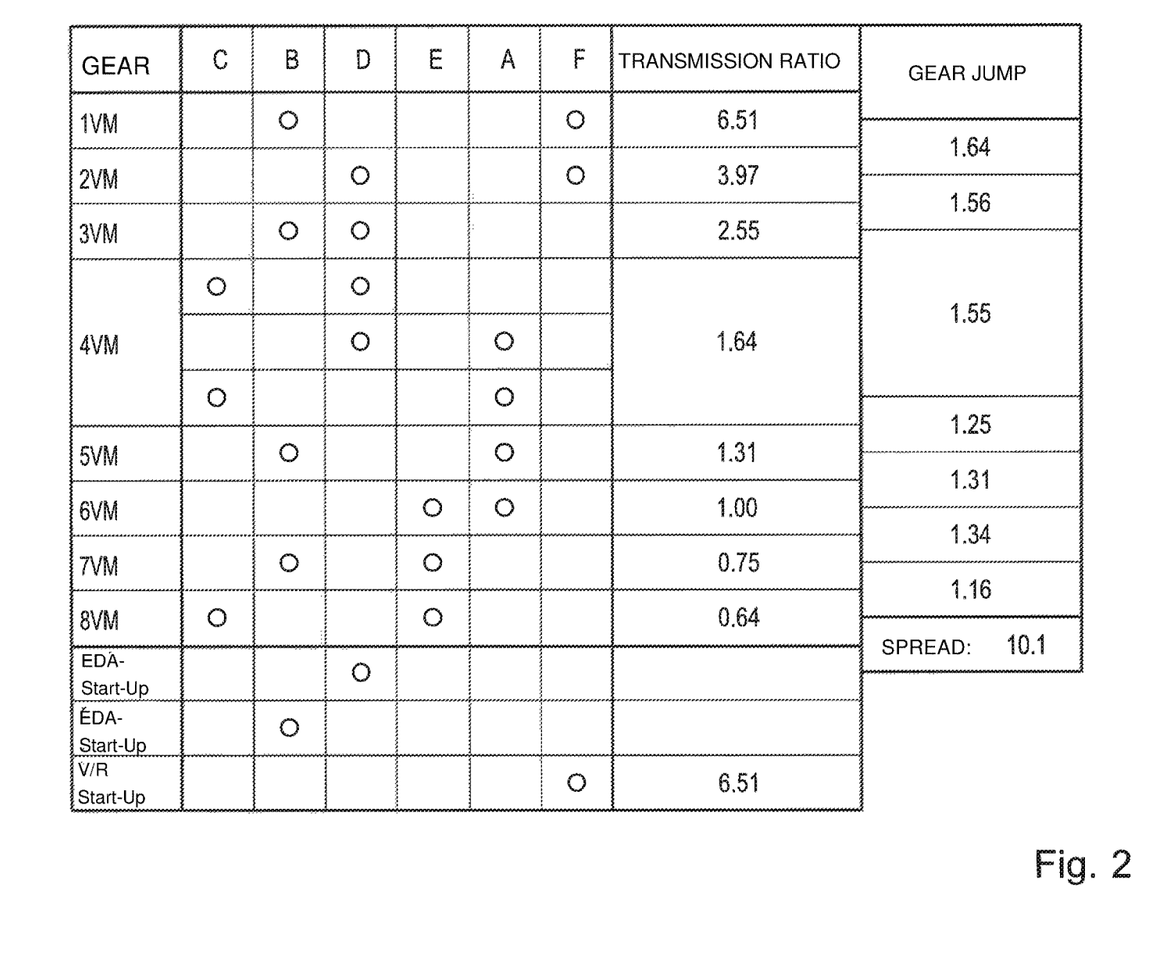
FIG. 2 is a shifting diagram of the exemplary transmission device in accordance with FIG. 1.

FIG. 2 shows a shifting diagram of the transmission device 3, in which transmission ratios 1VM through 8VM can be presented for forward travel. The respective shift elements A through F to be transferred or held for positioning of the relevant transmission ratio in a closed operating state are marked with a circle, while, in an open operating state, the shift elements A through F not marked with a circle are to be held or transferred into it. The values of the transmission ratios 1VM through 8VM arise from the stationary transmission ratios of the planetary gear sets P1, P2, P3 and P4. Thereby, the transmission ratio 1VM has the value 6.51, the transmission ratio 2VM has the value 3.97, the transmission ratio 3VM has the value 2.55, the transmission ratio 4VM has the value 1.64, the transmission ratio 5VM has the value 1.31, the transmission ratio 6VM has the value of 1.00, the transmission ratio 7VM has the value 0.75 and the transmission ratio 8VM for forward travel has the value 0.64. The gears 1VM through 8VM of the transmission device 3 are illustrated in the various lines of the shifting diagram. Furthermore, in an additional column of the shifting diagram, the respective gear jump between two adjacent gears is indicated. In addition, solely with a closed shift element D through B, the option exists of using the electric motor EM as an electrodynamic start-up element and driving a vehicle designed with the vehicle drive train 1 solely with electricity. If only the shift element F is closed in the transmission device 3, an all-electric forward or reverse driving mode of the vehicle drive train 1 can be presented with a transmission ratio value equal to 6.51, whereas the forward or reverse driving mode can be presented by various directions of rotation in the area of the electric motor EM.

A first reverse gear 1VM between the transmission input shaft GW1 and the transmission output shaft GW2 arises from the locking of the second shift element B and the sixth shift element F, a second forward gear 2VM arises from the locking of the fourth shift element D and the sixth shift element F, a third forward gear 3VM arises from the locking of the second shift element B and the fourth shift element D, a fourth forward gear 4VM arises from the locking of the fourth shift element D and the first shift element A, a fifth forward gear 5VM arises from the locking of the second shift element B and the first shift element A, a sixth forward gear 6VM arises from the locking of the fifth shift element E and the first shift element A, a seventh forward gear 7VM arises from the locking of the second shift element B and the fifth shift element E, and an eighth forward gear 8VM arises from the locking of the third shift element C and the fifth shift element E.

In the present case, a rotational vibration damper 15 is arranged between the drive motor 2 and the transmission input shaft GW1 in order to dampen rotational irregularities in the areas of the drive motor 2. In addition, an auxiliary electric motor 16 is provided in the connecting area between the drive motor 2 and the transmission input shaft GW1, this represents a so-called "starter generator," through which the drive motor 2 can be started with little effort.

Due to its comparatively high dead weight, the electric motor EM integrated into the transmission device 3 is mounted by means of a sturdy and precise bearing device 17 in the area of the component 7 fixed to the housing, in both a radial and axial direction. With the exemplary embodiment of the transmission device shown in FIG. 1, the bearing device 17 is formed as a grooved ball bearing and, depending on the particular application in the present case, may also be designed in a different manner. In addition to the electric motor EM, the coupled individual gears sets P1, P2 and P4 in the area of the bearing device 17 of the electric motor EM are also mounted or centered at least in a radial direction through additional bearing devices 18 through 21. In addition, the shift element halves of the shift elements A through F working together with the planetary gear sets P1, P2 and P4 are also at least partially mounted in the area of the bearing device 17.

The first shaft W5 of the auxiliary gear set ZRS is mounted in a radial direction and an axial direction directly in the area of the bearing device 17 of the electric motor EM. The shaft W1, which in the present case is designed as a hollow shaft, is centered or rotatably mounted in a radial direction by means of the bearing device 18 in the area of the bearing device 17. The second shaft W2, which is also designed as a hollow shaft, is centered and rotatably mounted in a radial direction by means of the bearing device 19, designed as a radial bearing, in the area of the first shaft W1 and thus also in the area of the bearing device 17 of the electric motor EM. In addition, the shaft W42, which can be designed as a hollow shaft or as a solid shaft, is also centered and rotatably mounted in a radial direction by means of the bearing device 20 through the two shafts W1 and W2 in the area of the bearing device 17.

In addition to being supported by a bearing device 22 provided on the side of the transmission input, the transmission input shaft GW1 is supported in a radial direction by means of the additional bearing device 21 through the shaft W42, the shaft W2 and the shaft W1 in the area of the bearing device 17 and thus of the bearing shield 7 and ultimately of the transmission housing 6 through a large construction width. The bearing devices 18 through 21 radially mounted into each other are arranged in a manner offset to each other in an axial direction. However, in principle, these bearing devices 18 through 21 are also able to be positioned directly above each other in an axial direction.

The shaft W41 is radially centered or guided in a radial direction in the area of the bearing device 17 of the electric motor EM by means of a bearing device 23, which is arranged between the shaft W41 and the shaft W5. The third shaft W3P4 of the auxiliary gear set ZRS is supported in a radial direction in the areas of the first shaft W1 by means of a bearing device 24 designed as a radial bearing. In addition, on the output side of the transmission, in the area of the shafts W1, W2, W3, W42 and the transmission output shaft GW2, radial forces can be supported by means of bearing devices 25 through 29 designed as radial bearings. In addition, between the shaft W3 and the shaft W42 and between the shaft W42 and the shaft W2 and between the shaft W2 and the shaft W1, bearing devices 30 through 32 designed as axial bearings are provided; through these bearing devices 30 to 32, axial forces in the area of the bearing device 25 designed as radial and axial bearings can be supported in the transmission housing 6.

Axial forces acting in the area of the shaft W41 of the main gear set HRS can be supported by means of both bearing devices 33, 34 designed as axial bearings either in the area of the bearing device 17 or in the area of the carrier St-P4 of the planetary gear set P4 and thus the shaft W1. In addition, there is also the option that the transmission input shaft GW1 is centered in a radial direction in the area of the third shaft W3P4 of the planetary gear set P4 of the auxiliary gear set ZRS, in order to achieve an advantageous centering through a construction width that is as great as possible.

The carrier St-P3 of the planetary gear set P3 of the upstream gear set VRS is also supported in an axial direction by means of a bearing device 35, designed as an axial bearing, in the area of the bearing shield 7. In addition, between the second shaft W2VS of the upstream gear set VRS and the transmission input shaft GW1, a bearing device 36 designed as a radial bearing and a bearing device 37 designed as an axial bearing are also provided in this area in order to introduce both radial forces and axial forces in the transmission housing 6.

The shaft W41 is formed as a hollow shaft stub that is connectable to a shaft (for example, to a carrier, a sun gear or a ring gear) of the coupled individual gear sets P1, P2 and P4, which can be centered in the area of the bearing device 17 of the electric motor EM by means of a radial bearing. Such a design offers the option of providing an advantageously small tolerance chain in the area of the mounting.

The number of axial bearing points of the planetary gear sets P1, P2 and P4 is greater by one than the number of the shafts W1 through W5, whereas, in the determination of the number of axial bearing points, each of the shafts W41 and W42 is considered to be its own shaft and the grooved ball bearing is likewise viewed as an axial bearing.

Thus, all of the shafts W1 through W5 of the coupled individual gear sets P1, P2 and P4, including the claw halves of the shift elements A through F connected to the shafts W1 through W5, can be fixed in an axial direction in the transmission housing 6 by means of a very small number of axial bearings.

FIG. 3 shows a detailed representation of the transmission device 3 in accordance with FIG. 1. The representation in accordance with FIG. 3 shows that the pistons 9 through 13, each of which is provided for actuating the shift elements C, B, D, E and A, are arranged coaxially to each other and radially into each other, and are axially displaceable in sections in one intermediate plate 38. The intermediate plate 38 features areas 39C, 39B, 39D, 39E, 39A, more specifically illustrated in FIG. 4 through FIG. 6, for applying the fluid pressures pCzu, pBzu, pDzu, pEzu and pAzu acting in the first actuating direction of the pistons 9 through 13 to the active surfaces 9A through 13A of the pistons 9 through 13. In addition, the area 40 through which the fluid pressure pauf that can be applied to the active surfaces 9B through 13B of the pistons 9 through 13 and acting in the second actuating direction can be guided to the pistons 9 through 13 is limited by the intermediate plate 38 and the pistons 9 through 13.

Figure 7:
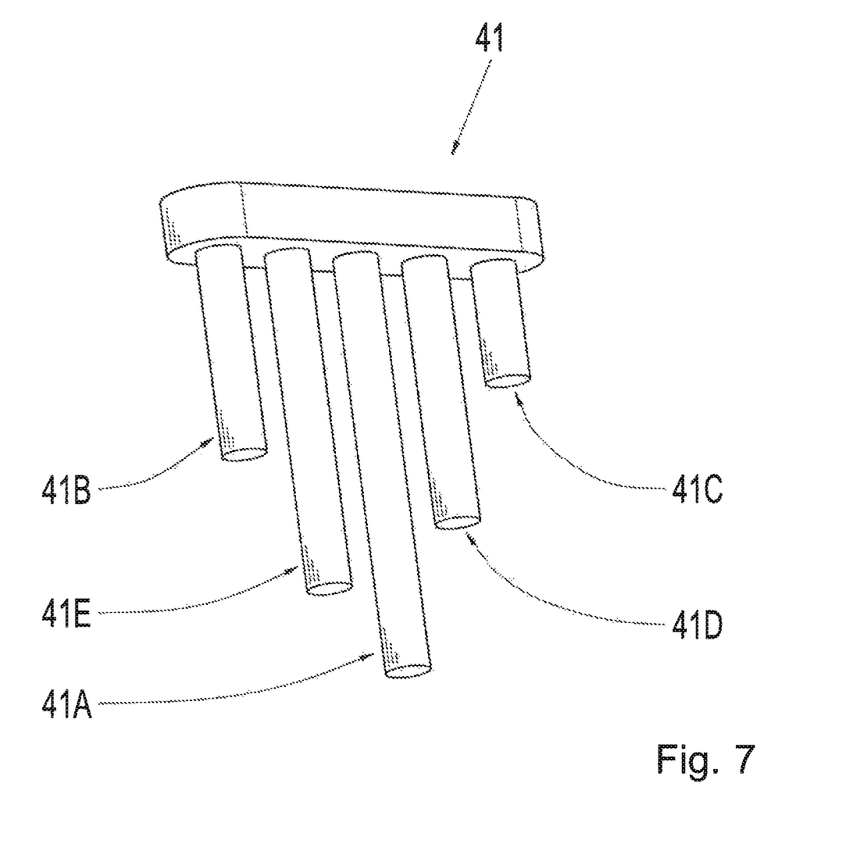
FIG. 7 is a schematic individual representation of a sensor device of the exemplary device in accordance with FIG. 3.

For detecting a current axial position of the pistons 9 through 13, a sensor device 41 presented in FIG. 7 is allocated to the pistons 9 through 13, which features pin-shaped sensor carriers or sensor holders 41A through 41E. In each case, the sensor carriers 41A through 41E are formed in the ends turned towards the pistons 9 through 13 with hall elements, which work with sensor areas 9C through 11C and 13C of the pistons 9 through 13 for detecting the current axial position of the pistons 9 through 13. Thereby, the sensor areas 9C through 11C of the pistons 9 through 12, which are torque-proof in the present case, are formed in a cone shape and are made of iron. This offers the option of, in the area of the hall elements of the sensor device 41, depending on the present axial positions of the pistons 9 through 12, generating a corresponding sensor signal and detecting the current axial positions of the pistons 9 through 12 with little effort.

In deviation from this, the sensor area 13C of the radially inwardly arranged piston 13 is formed with a conical ring surface 43, which also consists of iron, and works with the hall element of the sensor carrier 41C to the extent necessary to detect the current axial position of the piston 13. The design of the piston 13 with the conical annular surface 43 in turn offers the option of not necessarily having to design the piston 13 to be torque-proof.

In the present case, the pistons 10 through 13 of the transmission device 3 in accordance with FIG. 3 are connected through a rotational decoupling 44B, 44D, 44E and 44A to the shift elements B, D, E and A, respectively. With the embodiment of the transmission device 3 shown in FIG. 3, the sensor device 41 is arranged between the rotational decouplings 44B, 44D, 44E and 44A and the active surfaces of the pistons 9 through 13 that can be subjected to fluid pressures pauf or pzu, as the case may be.

Figure 4:
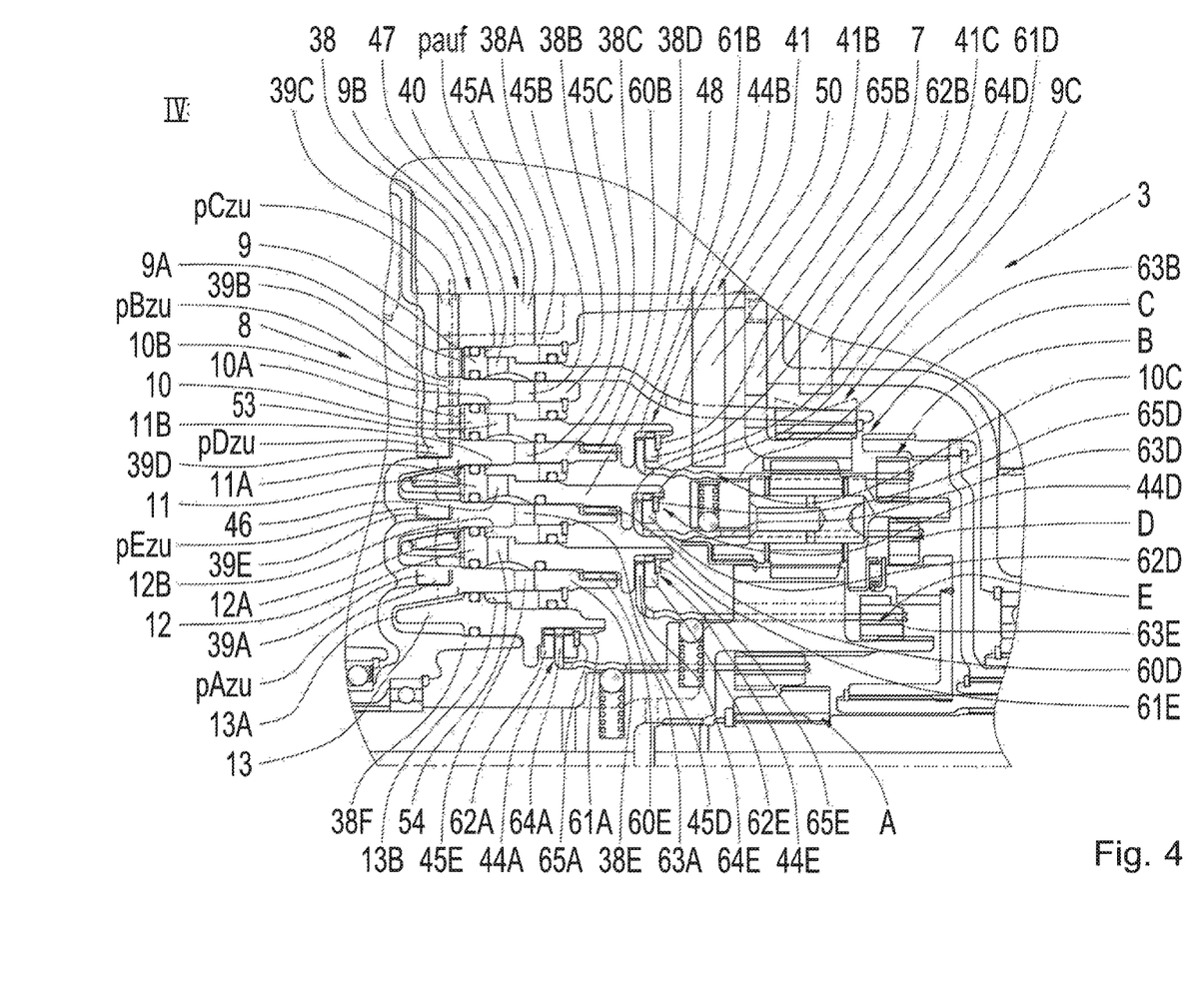
FIG. 4 is an enlarged representation of a second exemplary embodiment of the device in accordance with the invention, which is arranged in an area IV of the exemplary transmission device more specifically designated in FIG. 3.
Figure 5:
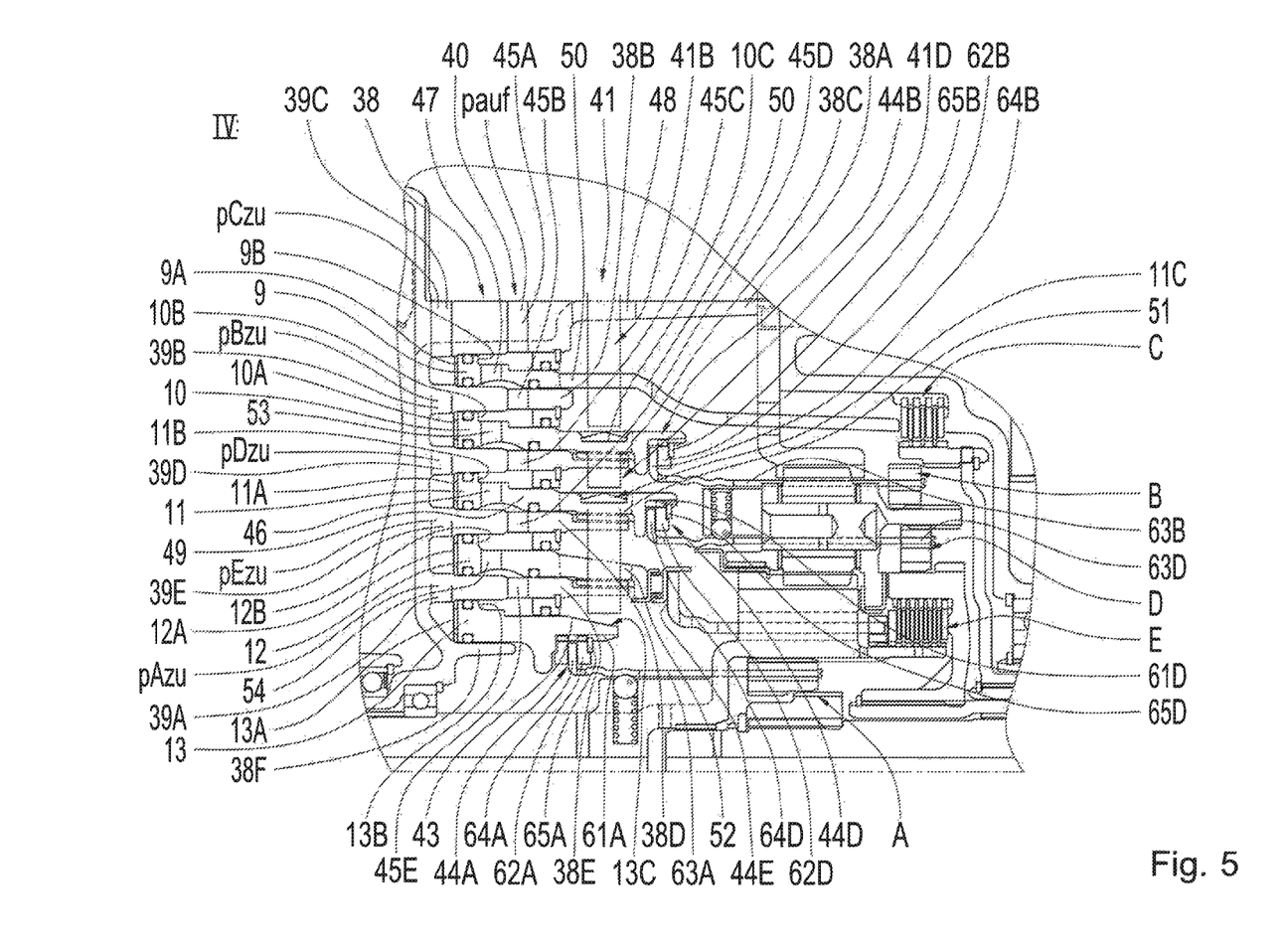
FIG. 5 is a representation corresponding to FIG. 4 of a third exemplary embodiment of the device in accordance with the invention.

FIG. 4 and FIG. 5 show an enlarged view of an area IV of the transmission device 3 marked in FIG. 3, in which the device 8 and the shift elements A through E are arranged. Thereby, two additional exemplary embodiments of the transmission device 3 and the device 8 are shown in FIG. 4 and FIG. 5. With the transmission device 3 in accordance with FIG. 4, as in the first exemplary embodiment of the transmission device 3 in accordance with FIG. 3, the shift elements A through E are formed as positive-locking shift elements; however, with the second exemplary embodiment of the transmission device 3 in accordance with FIG. 4, the sensor device 41 is arranged at the side of the rotational decouplings 44B, 44D, 44E or 44A turned away from the shift elements A through E.

In contrast to this, the shift elements C and E of the third exemplary embodiment of the transmission device 3 in accordance with FIG. 5 are designed as frictional shift elements, which is why the current axial position of the pistons 9 and 12 need not be monitored during the actuation of the shift elements C and E. For this reason, with the transmission device 3 in accordance with FIG. 5, only the current axial position of the pistons 10, 11 and 13 is monitored through the sensor device 41, which is then formed without the sensor carrier 41C and 41E, and in turn is arranged in the area between the rotational decouplings 44B, 44D, 44E and 44A and the active surfaces of the pistons 9 through 13 that can be subjected to fluid pressures pauf or pAzu through pEzu.

Both in FIG. 3 and also in FIG. 4 and FIG. 5, the pistons 10 through 12 of the shift elements B, D and E designed as clutches, along with the corresponding areas on the annular flanges 38C, 38D and 38E, are equipped with synchronization toothings 60B, 60D and 60E for anti-rotation protection.

Similarly, in the area of the rotational decouplings 44A, 44E, 44D and 44B, synchronization toothings 61A, 61E, 61D and 61B are advantageously provided for anti-rotation protection for guard plates 62A, 62E, 62D and 62B, by which the relative movement between the non-rotating pistons 10 through 13 and the shift elements A, B, D, E coupled through rotating sleeves 63A, 63E, 63D and 63B are, in each case, led in a targeted manner to the areas between the guard plates 62A, 62E, 62D, 62B and the bands 64A, 64E, 64D, 64B of the sleeves 63A, 63E, 63D and 63B. Thereby, the sleeves 63A, 63E, 63D and 63B and the guard plates 62A, 62E, 62D and 62B are arranged and axially fixed in an axial direction between the stop areas of the pistons 10, 11, 12 and 13 and the snap rings 65A, 65E, 65D and 65B inserted into the pistons 10, 11, 12 and 13.

Figure 6:
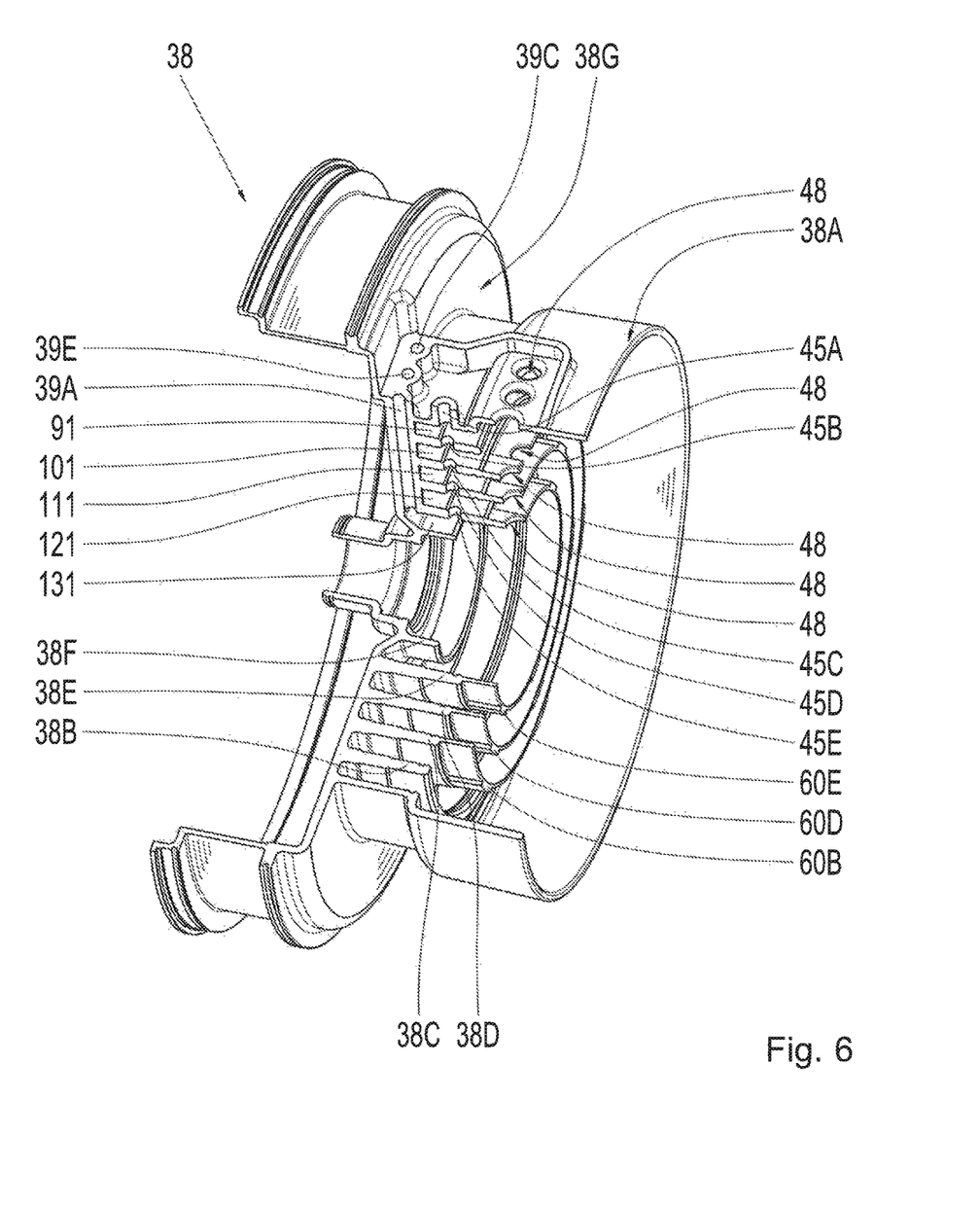
FIG. 6 is a three-dimensional sectional view of an intermediate plate of the first exemplary embodiment of the device in accordance with the invention.

FIG. 6 shows a three-dimensional single-sectional view of the intermediate plate 38, which comprises multiple annular flanges 38A to 38F that are spaced from each other concentrically and in a radial direction, which extend from a bottom plate area 38G in the direction of a free end area turned away from the bottom plate area 38G and between which ring-shaped piston chambers 91, 101, 111, 121 and 131 are formed, in which each of the pistons 9 through 13 is arranged in a manner displaceable in sections. Areas 39A through 39E for applying the fluid pressures pAzu through pEzu, acting in the first actuating direction of the pistons 9 through 13, at the active surfaces 9A through 13A of the pistons 9 through 13, are provided in the bottom plate area 38G and are formed as bore holes or channels running in a radial direction.

Both the annular flanges 38A through 38E of the intermediate plate 38 and the pistons 9 through 12 are designed with bore holes 45A through 45E or 46, 47, 53, 54, as the case may be, of the area 40 in connection with each other, as presented in FIG. 6 or FIG. 8 to FIG. 10, through which the fluid pressure pauf that can be applied to the active surfaces 9B through 13B of the pistons 9 through 13 and acting in the second actuating direction can be guided to the pistons 9 through 13.

Furthermore, both the annular flanges 38A through 38E of the intermediate plate 38 of the transmission device 3 in accordance with FIG. 3 and also the pistons 9 through 12 are designed with recesses 48 through 52, through which the sensor carriers 41A through 41E of the sensor device 41 can be guided to the pistons 9 through 13.

Figure 8:
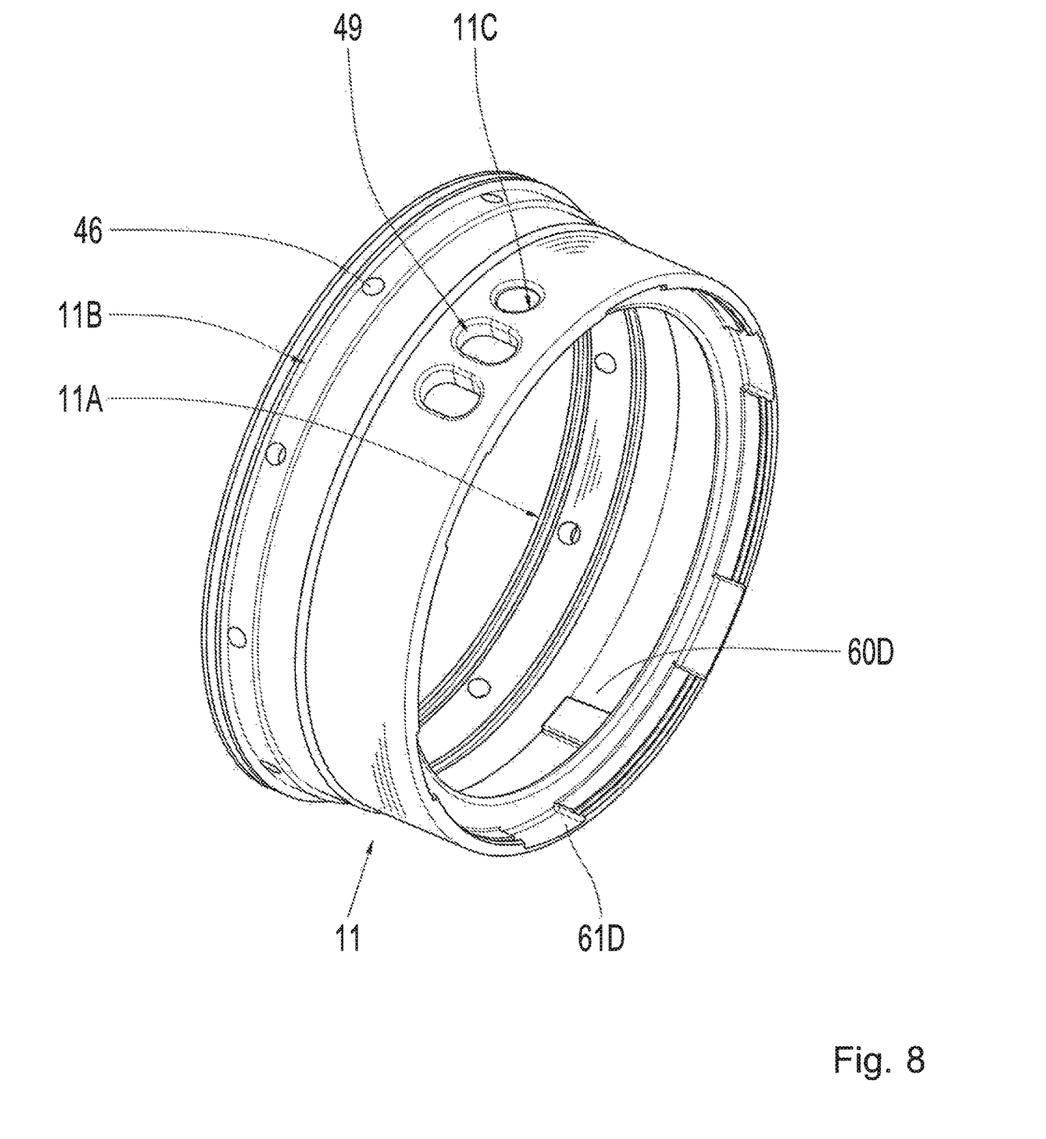
FIG. 8 is an individual representation of a piston of the exemplary device in accordance with FIG. 3.
Figure 9:
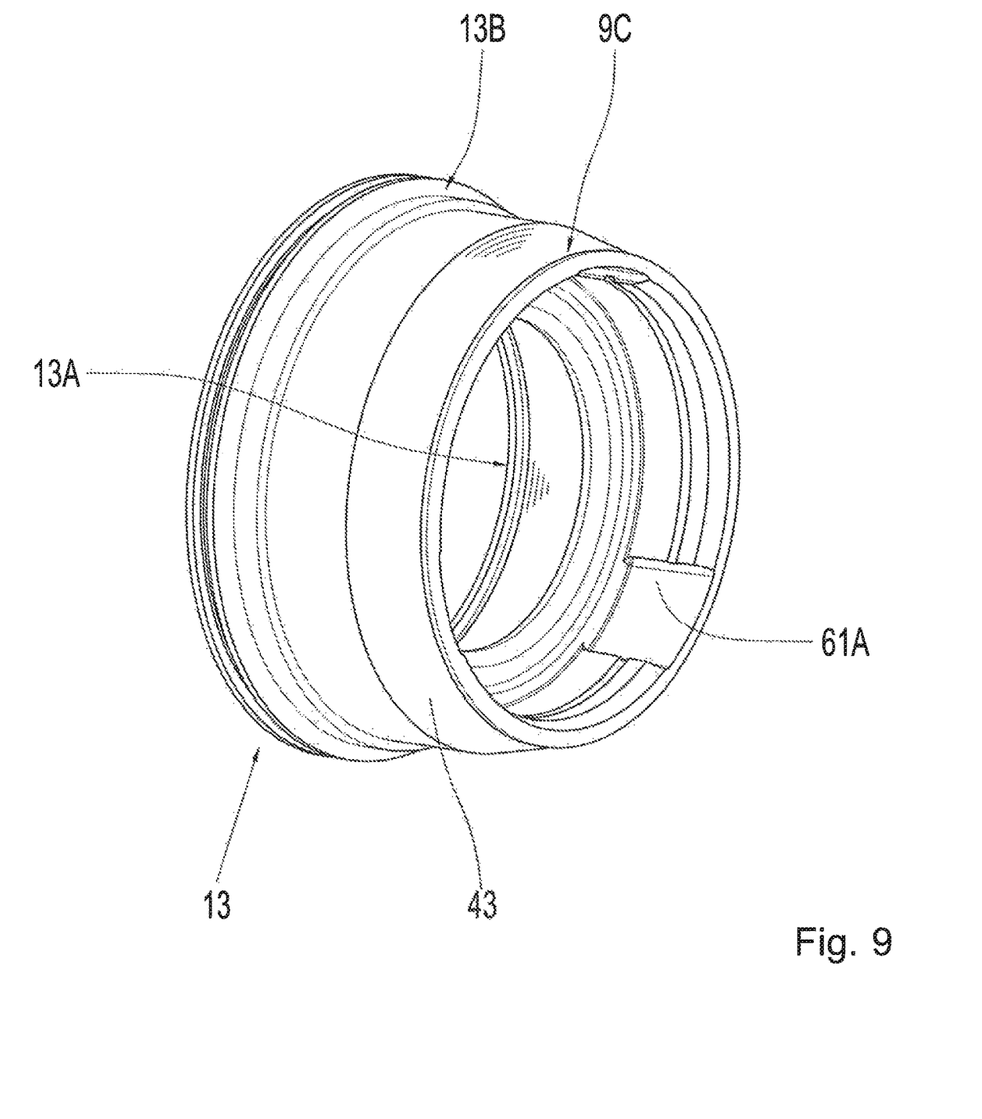
FIG. 9 is a sole representation of an additional piston of the exemplary device in accordance with FIG. 3.
Figure 10:
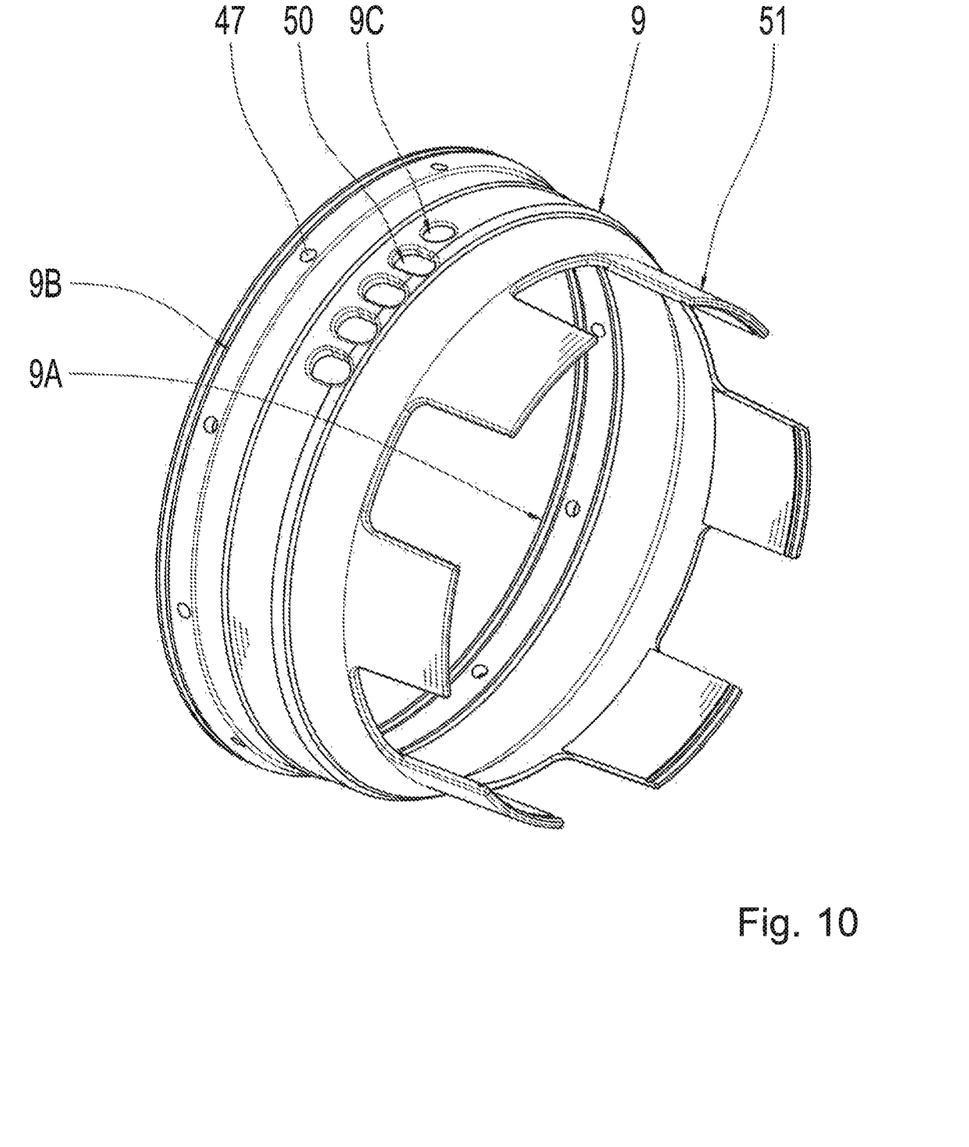
FIG. 10 is an additional piston of the exemplary device in accordance with FIG. 3 in a three-dimensional individual representation.

FIG. 8 shows the piston 11 allocated to the shift element D in a three-dimensional detail view, while FIG. 9 graphically reproduces the piston 13 allocated to the shift element A and FIG. 10 graphically reproduces the piston 9 allocated to the shift element C in a representation corresponding to FIG. 8. For example, the representation in accordance with FIG. 10 shows that the piston 9 features four recesses 50 for putting through the sensor holders 41B, 41E, 41A and 41D. The cone-shaped sensor area 9C of the piston 9 is positioned directly adjacent to the recesses 50; it works together with the hall element of the sensor carrier 41C of the sensor device 41 in the scope described above. In addition, the piston 9 is formed with a crown-shaped area 51, with which the piston 9 reaches through the ring gear Ho-P3 or the component 7 fixed to the housing, in order to be able to actuate the shift element C to the desired extent.

Since only the sensor carrier 41E and the sensor carrier 41A are to be guided by the piston 11 in the presented scope, the piston 11 features only two recesses 49, which in turn are provided in a circumferential direction directly adjacent to the sensor area 11C of the piston 11.

Depending on the particular application, it may be provided that the active surfaces 9A through 13A of the pistons 9 through 13 that can be subjected to the closing pressures pAzu through pEzu of the shift elements A through E correspond to the active surfaces 9B through 13B of the pistons 9 through 13, in the area of which the fluid pressure acting in the direction of opening pauf can be applied. By way of derogation from this, it can also be provided that the active surfaces 9A through 13A are larger than the active surfaces 9B through 13B, whereas the closing pressure pAzu through pEzu is then adjusted to a value corresponding to the opening pressure pauf. In turn, it may also alternatively be provided that both the active surfaces 9A through 13A and the active surfaces 9B through 13B are designed with different sizes, and also that the closing pressures pAzu through pEzu differ from the opening pressure pauf.

In principle, the opening pressure pauf permanently makes contact with the active surfaces 9B through 13B of the pistons 9 through 13, whereas the opening pressure pauf may correspond to a lubricating pressure in the transmission device 3 or another pressure present in the hydraulic system of the transmission device 3.

From a functional standpoint, it is preferable to use a pressure pauf separate from the closing pressure pAzu to pEzu for disengaging the shift elements A through E. Thereby, with an advantageous operating mode of the transmission device 3, the opening pressure pauf is adjusted in such a manner that it is always less than the closing pressure pAzu through pEzu. This ensures that a generated pressure is present, which is directly piloted by the system pressure or the main pressure, as the case may be, of the transmission device 3 with the valve transmission ratio, for example, equivalent to 0.5. This approach ensures that the opening pressure pauf is always only half the system pressure. This is also ensured if the system pressure is influenced by pressure peaks, pressure drops or other misadjustments.

In order to reduce the opening or disengaging pressure of the shift elements A through E to a preferred pressure level, it may be further provided that an additional adjustment variable is to be provided in the area of a disengaging valve, in the area of which the opening pressure pauf can be adjusted.

Such solutions have the advantage that a shift element, preferably designed as a claw shift element, of the transmission device can be held in an engaged or disengaged operating state independent of the system pressure, whereas this can be ensured up to a vehicle standstill or up to a deactivated operating state of the vehicle.

This is preferred because, for example, with an activated engine stop system or during the start of the pump, the position of a shift element designed as a claw shift element is to be already predetermined or retained.

The same functionality is also sought in the area of the claw valves allocated to the shift elements or claw shift elements, as the case may be, in the area of which the actuating pressure or the fluid pressure acting in the direction of closing, as the case may be, is adjusted.

Modifications and variations can be made to the embodiments illustrated or described herein without departing from the scope and spirit of the invention as set forth in the appended claims.

REFERENCE SIGNS

1 Vehicle drive train
2 Drive motor
3 Transmission device
4 Output shaft
5 Drive
6 Transmission housing
7 Component fixed to the housing
8 Device
9 Piston
9A Active surface
9B Active surface
9C Sensor area
10 Piston
10A Active surface
10B Active surface
10C Sensor area
11 Piston
11A Active surface
11B Active surface
11C Sensor area
12 Piston
12A Active surface
12B Active surface
12C Sensor area
13 Piston
13A Active surface
13B Active surface
13C Sensor area
14 Piston
15 Rotational vibration damper
16 Auxiliary electric motor
17-37 Bearing device
38 Intermediate plate
38A-F Annular flange
38G Bottom plate area
39A-E Area
40 Area
41 Sensor device
41A-E Sensor holder, sensor carrier
43 Conical annular surface
44A, B, D, E Rotational decoupling
45A-E Bore hole
46, 47 Bore hole
48-50 Recess
51 Crown-shaped area
52 Recess
53, 54 Bore hole
60B, D, E Synchronization toothing
61A, E, D, B Synchronization toothing
62A, E, D, B Guard plate
63A, E, D, B Sleeve
64A, E, D, B Band of the sleeve
65A, E, D, B Snap ring
91 Piston chamber
101 Piston chamber
111 Piston chamber
121 Piston chamber
131 Piston chamber
1VM to 8VM First to eighth forward gears
A-F Shift element
EM Electric motor
GW1 Transmission input shaft
GW2 Transmission output shaft
Ho1-P1 Part of the ring gear of the first planetary gear set of the main gear set
Ho2-P1 Part of the ring gear of the first planetary gear set of the main gear set
Ho-P1 Ring gear of the first planetary gear set of the main gear set
Ho-P2 Ring gear of the second planetary gear set of the main gear set
Ho-P3 Ring gear of the planetary gear set of the upstream gear set
Ho-P4 Ring gear of the planetary gear set of the auxiliary gear set
HRS Main gear set
L1 First power path
L2 Second power path
P1 Planetary gear set of the main gear set
P2 Planetary gear set of the main gear set P3 Planetary gear set of the upstream gear set
P4 Planetary gear set of the auxiliary gear set
pauf Opening pressure
pAzu-pEzu Closing pressure
R Rotor of the electric motor
S Stator of the electric motor
So-P1P2 Common sun gear of the main gear set
So-P3 Sun gear of the planetary gear set of the upstream gear set
So-P4 Sun gear of the planetary gear set of the auxiliary gear set
St-P3 Carrier of the planetary gear set of the upstream gear set
St-P4 Carrier of the planetary gear set of the auxiliary gear set
VRS Upstream gear set
W1 First shaft of the main gear set
W1VS First shaft of the upstream gear set
W2 Second shaft of the main gear set
W2P4 Second shaft of the auxiliary gear set
W2VS Second shaft of the upstream gear set
W3 Third shaft of the main gear set
W3P4 Third shaft of the auxiliary gear set
W3VS Third shaft of the upstream gear set
W4 Fourth shaft of the main gear set
W41 Shaft of the main gear set
W42 Shaft of the main gear set
W5 First shaft of the auxiliary gear set
ZRS Auxiliary gear set

The invention claimed is:

1. A device for actuating a plurality of shift elements in an automatic transmission, comprising:
a plurality of pistons, each piston of the plurality of pistons configured for changing an operating state of a respective shift element of the plurality of shift elements, each piston of the plurality of pistons subjectable to a respective fluid pressure acting in a first actuating direction or a fluid pressure acting in a second actuating direction, the respective fluid pressure acting in the first actuating direction separately adjustable for each shift element of the plurality of shift elements, the fluid pressure acting in the second actuating direction essentially the same for all shift elements of the plurality of shift elements, the pistons of the plurality of pistons arranged coaxially relative to each other, the pistons of the plurality of pistons positioned radially spaced apart from each other; and
an intermediate plate having a plurality of areas for applying the fluid pressures acting in the first actuating direction to the pistons of the plurality of pistons, the pistons of the plurality of pistons arranged such that the plurality of pistons are in part axially displaceable in the intermediate plate,
wherein the intermediate plate and the pistons of the plurality of pistons define a volume that guides the fluid pressure acting in the second actuating direction.

2. The device according to claim 1, wherein the intermediate plate comprises a plurality of annular flanges and a bottom plate, the annular flanges of the plurality of annular flanges positioned concentrically and spaced from each other radially, the annular flanges of the plurality of annular flanges extending away from the bottom plate, the annular flanges of the plurality of annular flanges defining a plurality of ring-shaped piston chambers, each piston of the plurality of pistons being separately displaceable in a respective ring-shaped piston chamber of the plurality of ring-shaped piston chambers.

3. The device according to claim 2, wherein each annular flange of the plurality of annular flanges and each piston of the plurality of pistons defines a bore hole that guides the fluid pressure acting in the second actuating direction.

4. The device according to claim 2, wherein the areas of the plurality of areas for applying the fluid pressures acting in the first actuating direction are radially extending bore holes or channels proximate the bottom plate.

5. The device according to claim 2, further comprising a sensor configured for detecting an axial position of each piston of the plurality of pistons.

6. The device according to claim 5, wherein at least one annular flange of the plurality of annular flanges defines a recess through which a sensor carrier of the sensor extends to a respective piston of the plurality of pistons, the sensor carrier of the sensor comprising a Hall effect element facing a sensor area the respective piston of the plurality of pistons in order to detect the axial position of the respective piston of the plurality of pistons.

7. The device according to claim 6, wherein the sensor area of the respective piston of the plurality of pistons comprises a cone shaped ferromagnetic material.

8. The device according to claim 6, wherein the sensor area of the respective piston of the plurality of pistons comprises a conical annular surface of ferromagnetic material.

9. The device according to claim 6, wherein the sensor carrier of the sensor is cylindrical and extends through slot shaped recesses in the annular flangesof the plurality of annular flanges to the sensor area of the respective piston of the plurality of pistons.

10. The device according to claim 5, wherein two or more pistons of the plurality of pistons through which the sensor radially extends are fixed in a torque-proof manner and are operatively connected with a shift element half of the respective shift element of the plurality of shift elements at least partially through a rotational decoupling, the rotational decoupling comprising at least one of a slide bearing and a roller bearing.

11. The device according to claim 10, wherein the sensor is arranged between the rotational decoupling and the respective shift element of the plurality of shift elements or between the rotational decoupling and the plurality of areas of the intermediate plate.

12. The device according to claim 5, wherein each piston of the plurality of pistons that is coupled with a respective clutch of the plurality of shift elements and a corresponding area on the annular flanges of the plurality of annular flanges each comprise synchronization teeth.

13. The device according to one of the claims 12, wherein the synchronization teeth are positioned proximate a rotational decoupling, the synchronization teeth configured to limit rotation of a guard plate, the guard plate configured to direct relative rotation between the respective piston of the plurality of pistons and the respective shift element of the plurality of shift elements to an area between the guard plate and a band of a sleeve.

14. The device according to claim 13, wherein the sleeve and the guard plate are disposed and fixed in an axial direction between a stop area of the respectivepiston of the plurality of pistons and a snap ring inserted into the respective piston of the plurality of pistons proximate the stop area.

* * * * *